(12) United States Patent
Cecchi et al.

(10) Patent No.: US 9,722,965 B2
(45) Date of Patent: Aug. 1, 2017

(54) SMARTPHONE INDICATOR FOR CONVERSATION NONPRODUCTIVITY

(71) Applicant: International Business Machines Corporation, Armonk, NY (US)

(72) Inventors: Guillermo A. Cecchi, New York, NY (US); James R. Kozloski, New Fairfield, CT (US); Clifford A. Pickover, Yorktown Heights, NY (US); Irina Rish, Rye Brook, NY (US)

(73) Assignee: International Business Machines Corporation, Armonk, NY (US)

( * ) Notice: Subject to any disclaimer, the term of this patent is extended or adjusted under 35 U.S.C. 154(b) by 182 days.

(21) Appl. No.: 14/608,393

(22) Filed: Jan. 29, 2015

(65) Prior Publication Data

US 2016/0226813 A1 Aug. 4, 2016

(51) Int. Cl.
*G06F 15/16* (2006.01)
*H04L 12/58* (2006.01)
(Continued)

(52) U.S. Cl.
CPC ............ *H04L 51/34* (2013.01); *G06F 17/277* (2013.01); *G06F 17/2785* (2013.01);
(Continued)

(58) Field of Classification Search
CPC ..... H04L 51/34; H04L 12/1895; H04L 51/32; H04L 51/04; G06N 99/005; G06F 17/277; G06F 17/30598
(Continued)

(56) References Cited

U.S. PATENT DOCUMENTS 6,151,571 A * 11/2000 Pertrushin ............... G10L 17/26
704/207
6,353,810 B1 * 3/2002 Petrushin ............... G10L 17/26
704/236
(Continued)

FOREIGN PATENT DOCUMENTS

WO 2012125653 A1 9/2012
WO 2012160193 A1 11/2012

OTHER PUBLICATIONS

Anonymous, "System and Method for Automatic Creation of Smart Phone Events from Conversations," An IP.com Prior Art Database Technical Disclosure, Jan. 12, 2011, p. 1-3, IP.com No. 000202962.
(Continued)

*Primary Examiner* — Philip Chea
*Assistant Examiner* — Wing Ma
(74) *Attorney, Agent, or Firm* — Patricia B. Feighan (57) ABSTRACT

A method to send an alert for nonproductivity associated with a conversation is provided. The method may include recording a plurality of communication outputs of at least two users engaged in a remote message exchange or a remote conversation. The method may also include creating a plurality of text tokens based on the recorded plurality of communication outputs. The method may include analyzing, by a graphical text analyzer, the created plurality of text tokens to determine whether the plurality of text tokens has fallen below a threshold. The method may further include sending an alert to the plurality of users involved in the conversation if it is determined that the plurality of text tokens has fallen below the threshold.

15 Claims, 8 Drawing Sheets

(51) Int. Cl.
*G06F 17/27* (2006.01)
*G06F 17/30* (2006.01)
*G06N 99/00* (2010.01)
*H04L 12/18* (2006.01)

(52) U.S. Cl.
CPC ..... *G06F 17/30598* (2013.01); *G06N 99/005* (2013.01); *H04L 12/1895* (2013.01); *H04L 51/04* (2013.01); *H04L 51/32* (2013.01)

(58) Field of Classification Search
USPC .......................................................... 709/206
See application file for complete search history.

(56) References Cited

U.S. PATENT DOCUMENTS

| | | | | |
|---|---|---|---|---|
| 6,363,145 | B1* | 3/2002 | Shaffer | H04M 3/2281 379/265.02 |
| 6,522,333 | B1* | 2/2003 | Hatlelid | G06T 13/40 345/473 |
| 6,665,644 | B1* | 12/2003 | Kanevsky | G10L 17/26 704/246 |
| 6,721,704 | B1 | 4/2004 | Strubbe et al. | |
| 7,507,091 | B1* | 3/2009 | Aleali | G09B 7/00 434/236 |
| 7,877,697 | B2 | 1/2011 | Canfield et al. | |
| 7,881,234 | B2 | 2/2011 | Abernethy, Jr. et al. | |
| 9,257,122 | B1* | 2/2016 | Cancro | G10L 17/26 |
| 2002/0002460 | A1* | 1/2002 | Pertrushin | G10L 17/26 704/270 |
| 2002/0002464 | A1* | 1/2002 | Petrushin | G10L 17/26 704/275 |
| 2002/0155855 | A1 | 10/2002 | Lee et al. | |
| 2002/0193996 | A1* | 12/2002 | Squibbs | H04M 1/72547 704/260 |
| 2003/0033145 | A1* | 2/2003 | Petrushin | G10L 17/26 704/236 |
| 2004/0083101 | A1* | 4/2004 | Brown | G10L 15/26 704/235 |
| 2004/0093218 | A1* | 5/2004 | Bezar | G10L 17/26 704/273 |
| 2004/0210159 | A1* | 10/2004 | Kibar | A61B 5/4803 600/558 |
| 2005/0262209 | A1* | 11/2005 | Yu | H04L 51/28 709/206 |
| 2006/0265089 | A1* | 11/2006 | Conway | G10L 15/22 700/94 |
| 2006/0265090 | A1* | 11/2006 | Conway | H04M 3/42221 700/94 |
| 2007/0005754 | A1* | 1/2007 | Horvitz | H04L 67/22 709/224 |
| 2007/0011270 | A1 | 1/2007 | Klein et al. | |
| 2007/0038436 | A1* | 2/2007 | Cristo | G06F 17/273 704/9 |
| 2007/0071206 | A1* | 3/2007 | Gainsboro | H04M 3/2281 379/168 |
| 2007/0208569 | A1* | 9/2007 | Subramanian | G10L 19/0018 704/270 |
| 2008/0215972 | A1* | 9/2008 | Zalewski | A63F 13/31 715/706 |
| 2010/0158213 | A1* | 6/2010 | Mikan | H04M 3/42221 379/88.14 |
| 2010/0273546 | A1* | 10/2010 | Lior | G07F 17/32 463/13 |
| 2010/0332287 | A1* | 12/2010 | Gates | G06F 17/277 705/7.32 |
| 2011/0050460 | A1 | 3/2011 | Bruns et al. | |
| 2011/0148916 | A1* | 6/2011 | Blattner | G06Q 10/107 345/619 |
| 2011/0164742 | A1 | 7/2011 | Harma | |
| 2011/0213610 | A1* | 9/2011 | Chen | G06F 17/2715 704/9 |
| 2011/0295392 | A1* | 12/2011 | Cunnington | G06Q 10/10 700/90 |
| 2012/0151046 | A1* | 6/2012 | Weiss | G06F 21/604 709/224 |
| 2012/0151047 | A1* | 6/2012 | Hodges | G06F 21/604 709/224 |
| 2012/0191730 | A1* | 7/2012 | Parikh | G06Q 30/0201 707/754 |
| 2012/0203545 | A1* | 8/2012 | Shaw | G06F 17/279 704/9 |
| 2012/0239767 | A1 | 9/2012 | DeLuca | |
| 2012/0290511 | A1* | 11/2012 | Frank | G06N 99/005 706/12 |
| 2012/0317038 | A1* | 12/2012 | Erbey | H04M 3/5183 705/304 |
| 2013/0039501 | A1 | 2/2013 | Grimes et al. | |
| 2013/0041661 | A1* | 2/2013 | Lee | G10L 15/26 704/235 |
| 2013/0063256 | A1 | 3/2013 | Tartz et al. | |
| 2013/0132480 | A1 | 5/2013 | Tsuji et al. | |
| 2013/0185057 | A1* | 7/2013 | Yoon | G06F 17/24 704/9 |
| 2013/0325437 | A1* | 12/2013 | Lehman | G06F 17/2785 704/9 |
| 2014/0140497 | A1* | 5/2014 | Ripa | H04M 3/5133 379/265.06 |
| 2014/0204173 | A1 | 7/2014 | Eidelson et al. | |
| 2014/0212854 | A1* | 7/2014 | Divakaran | G09B 25/00 434/236 |
| 2014/0220526 | A1* | 8/2014 | Sylves | G06Q 30/0201 434/238 |
| 2014/0244264 | A1* | 8/2014 | Thirumalainambi | G06F 17/2785 704/270 |
| 2014/0257820 | A1* | 9/2014 | Laperdon | G10L 25/63 704/270 |
| 2015/0163258 | A1* | 6/2015 | Garcia, III | H04L 67/24 709/204 |
| 2015/0186354 | A1* | 7/2015 | Kim | G06F 17/27 704/9 |
| 2015/0256675 | A1* | 9/2015 | Sri | H04M 3/5183 379/265.09 |
| 2015/0310852 | A1* | 10/2015 | Spizzo | G10L 25/48 704/251 |
| 2015/0317376 | A1* | 11/2015 | Bauer | G06F 17/30598 707/737 |
| 2015/0332672 | A1* | 11/2015 | Akbacak | G10L 15/18 704/257 |
| 2016/0071024 | A1* | 3/2016 | Amer | G06N 99/005 706/12 |
| 2016/0071510 | A1* | 3/2016 | Li | G10L 13/08 704/260 |
| 2016/0098393 | A1* | 4/2016 | Hebert | G06F 17/28 704/9 |
| 2016/0124940 | A1* | 5/2016 | Cecchi | G06F 17/30705 704/9 |
| 2016/0163332 | A1* | 6/2016 | Un | G10L 13/08 704/260 |
| 2016/0203729 | A1* | 7/2016 | Zilca | A61B 5/165 434/236 |

OTHER PUBLICATIONS

Böhmer et al., "Smartphone Use Does Not Have to Be Rude: Making Phones a Collaborative Presence in Meetings," Mobile HCI 2013—Collaboration and Communication, Aug. 30, 2013, p. 342-351, ACM, Munich, Germany.

Luo et al., "SocialWeaver: Collaborative Inference of Human Conversation Networks Using Smartphones," SenSys'13, Nov. 11-15, 2013, ACM, Roma, Italy.

Mell et al., "The NIST Definition of Cloud Computing," National Institute of Standards and Technology, Information Technology Laboratory, Oct. 7, 2009, Version 15.

Takeuchi et al., "A Conversation-Mining System for Gathering Insights to Improve Agent Productivity," The 9th IEEE International Conference on E-Commerce Technology and the 4th IEEE Inter- (56) References Cited

OTHER PUBLICATIONS national Conference on Enterprise Computing, E-Commerce and E-Services(CEC-EEE 2007), 2007, IEEE Computer Society.

* cited by examiner

SMARTPHONE INDICATOR FOR CONVERSATION NONPRODUCTIVITY

BACKGROUND

The present invention relates generally to the field of computers, and more particularly to smartphone conversations.

Remote conversations by two or more users are a common occurrence within modern day life, both socially and professionally. Remote conversation technology is based upon telecommunication technologies for the reception and transmission of audio signals by users at different locations, for communication between people in real-time. The telecommunication technologies allow two or more people at different locations to communicate by simultaneous two-way audio transmissions. Such conversations may be between business partners, friends, relatives, a doctor and patient, etc. However, often users engaged in remote conversations may be unaware or unable to note openly when a discussion is no longer productive, due to the lack of visual or other indicators of social acceptability of the other party.

SUMMARY

According to one embodiment, a method to send an alert for nonproductivity associated with a conversation is provided. The method may include recording a plurality of communication outputs of at least two users engaged in a remote message exchange or a remote conversation. The method may also include creating a plurality of text tokens based on the recorded plurality of communication outputs. The method may include analyzing, by a graphical text analyzer, the created plurality of text tokens to determine whether the plurality of text tokens has fallen below a threshold. The method may further include sending an alert to the plurality of users involved in the conversation if it is determined that the plurality of text tokens has fallen below the threshold.

According to another embodiment, a computer system to send an alert for nonproductivity associated with a conversation is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include recording a plurality of communication outputs of at least two users engaged in a remote message exchange or a remote conversation. The method may also include creating a plurality of text tokens based on the recorded plurality of communication outputs. The method may include analyzing, by a graphical text analyzer, the created plurality of text tokens to determine whether the plurality of text tokens has fallen below a threshold. The method may further include sending an alert to the plurality of users involved in the conversation if it is determined that the plurality of text tokens has fallen below the threshold.

According to yet another embodiment, a computer program product to send an alert for nonproductivity associated with a conversation is provided. The computer program product may include one or more computer-readable storage devices and program instructions stored on at least one of the one or me tangible storage devices, the program instructions executable by a processor. The computer program product may include program instructions to record a plurality of speech or a plurality of text outputs of at least two users engaged in a remote message exchange or a remote conversation. The computer program product may also include program instructions to record a plurality of communication outputs of at least two users engaged in a remote message exchange or a remote conversation. The computer program product may also include program instructions to create a plurality of text tokens based on the recorded plurality of communication outputs. The computer program product may include program instructions to analyze, by a graphical text analyzer, the created plurality of text tokens to determine whether the plurality of text tokens has fallen below a threshold. The computer program product may further include program instructions to send an alert to the plurality of users involved in the conversation if it is determined that the plurality of text tokens has fallen below the threshold.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computers, and more particularly to smartphone conversations. The following described exemplary embodiments provide a system, method and program product to, among other things, indicate nonproductivity during a smartphone conversation. Therefore, the present embodiment has the capacity to improve the technical field of telecommunications by measuring the productivity of a smartphone conversation (i.e., the text and speech to text of users of a remote messaging or communication system) via a graphical text analyzer. More specifically, during a smartphone conversation, a speech to text analysis may be used that may include the analysis of tone, mood, speed of speech, etc. to assess the productivity of a smartphone conversation.

As previously described, telecommunication technologies allow two or more people in different locations to communicate by simultaneous two-way audio transmissions. However, often users engaged in remote conversations may be unaware or unable to note openly when a discussion is no longer productive. This may be due to the lack of visual or other indicators of social acceptability, such as the body language of the other party. As such, it may be advantageous, among other things, to measure the productivity of a conversation via a graphical text analyzer.

According to at least one implementation, the present embodiment may use a graphical text analyzer to characterize an interaction between users of an electronic communication medium. Then, the shape of the composite graph between users may be used to determine a conversation's level of productivity. Once the conversation falls below a certain level (such as a confidence level of C), the phone (i.e., smartphone) may indicate a warning that the conversation is no longer productive.

More specifically, during a phone conversation, speech to text analysis, such as the analysis of tone, mood, speed of speech, etc., may be used to assess the productivity of the phone conversation. An unproductive conversation may be a cyclic conversation, a conversation that has slowed down, or a conversation that has not reached a conclusion in a given time. According to at least one implementation of the present embodiment, when the conversation is becoming unproductive with confidence level C, an alert may be provided to the user. The alert may be a color, a flashing light, a sound, etc. The color may be displayed on the phone or a monitor. To help increase the confidence of such assessments, the graphs of current conversations can be compared to those in the past that have led to one or more problems. The present embodiment may be implemented with the use of graphical text analytics, a productivity threshold, and an indicator, with a service to provide the present embodiment across phone vendors.

The present embodiment provides a smartphone indicator for conversation nonproductivity. As such, the method may record communication outputs (i.e., speech and text outputs) of individuals engaged in a remote message exchange or conversation to create text tokens. Then the text tokens may be analyzed by a graphical text analyzer using machine-learning tools that extract predictive features from token sequences, and makes inferences about the category of the current cognitive category of users and the cognitive state of the conversation. Categories for each individual and conversation are then analyzed and compared, clustered, and used to determine cognitive types of the users and the assessed conversation between them. Then, an additional mitigation action or a warning message to each individual may be triggered when a conversation falls below a threshold (i.e., a confidence level C) for productivity or engagement. The present embodiment may also use machine learning over the graphical text analysis.

Furthermore, the present embodiment may analyze text and speech to text of users of a remote messaging or communication system to categorize the conversation and user cognitive states determined by the machine learning. As such, the prior speech and current speech of an individuals' conversations may be used to relate the individuals' conversations to other categories of productivity or engagement based on a metric of cognitive type correlation. Therefore, the method may use prior information on conversation productivity. Also, the method may use automated alerts or assistance that is automatically triggered on a remote device when a conversation falls below a threshold for productivity or engagement.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product to provide a product recommendation to indicate nonproductivity during a smartphone conversation.

According to at least one implementation, the present embodiment may use a graphical text analyzer, where speech to text is analyzed during phone conversations, such as a conversation using a smart phone or with a text, voice, or video application, such as with Skype® (Skype and all Skype-based trademarks and logos are trademarks or registered trademarks of Microsoft and/or its affiliates). For example, this may be a conversation between business partners, friends, mother and son, doctor and patient. When the conversation is becoming unproductive with a confidence level C, an alert may be provided to the user. As previously described, the alert may be a color, a flashing light, a sound, etc. The color may be displayed on the phone or monitor. For example, an orange indicator at the top of a smart phone may show a user that a conversation with a colleague is becoming unproductive with a confidence level C. To help increase the confidence of such assessments, the graphs of current conversations may be compared to those in the past that have led to one or more problems. According to various implementations, a trans-vendor service may be used to implement the present embodiment across phone vendors.

Figure 1:
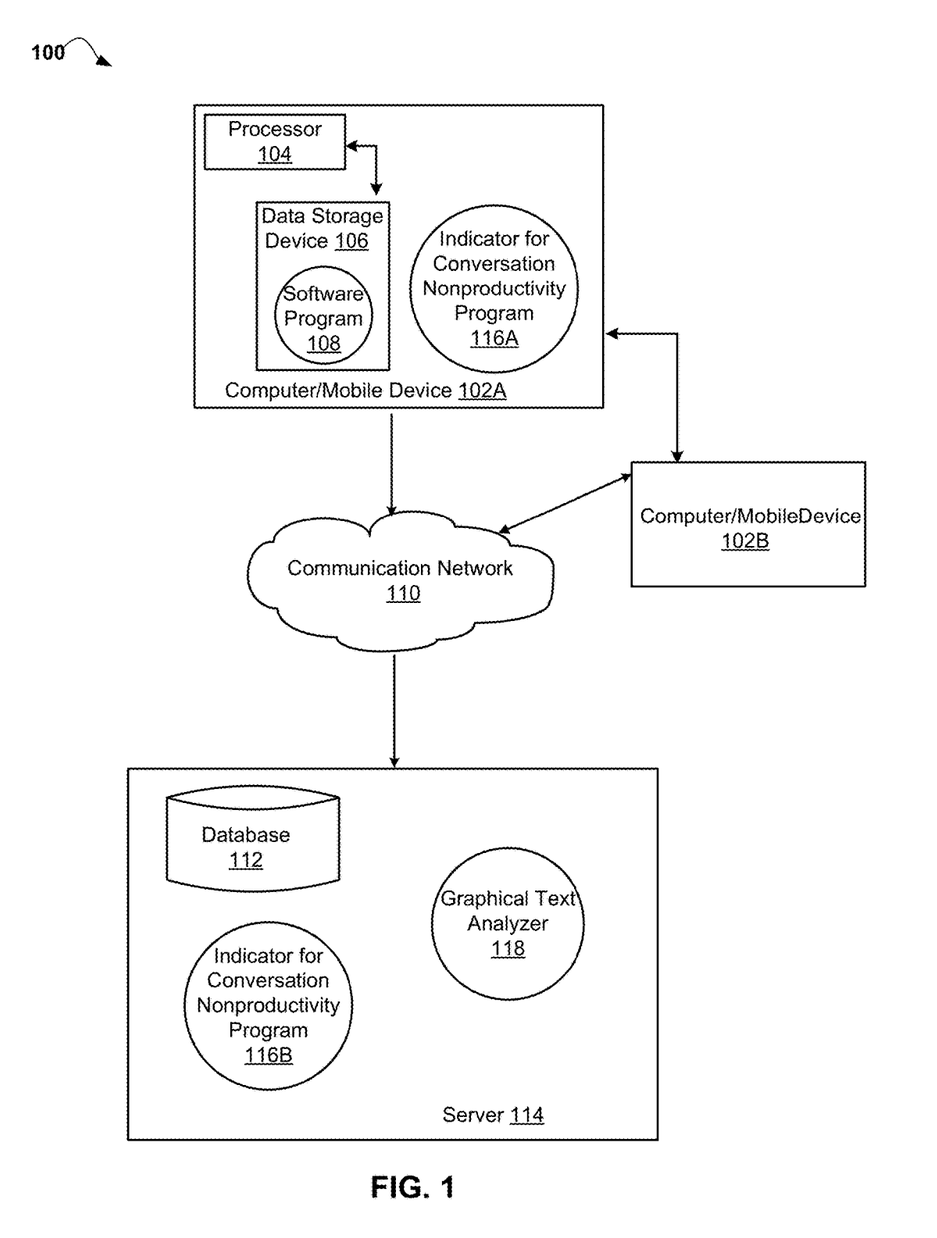
FIG. 1 illustrates a networked computer environment according to one embodiment.

Referring to FIG. 1, an exemplary networked computer environment 100 in accordance with one embodiment is depicted. The networked computer environment 100 may include a computer 102A, 102B with a processor 104 and a data storage device 106 that is enabled to run a software program 108 and an Indicator for Conversation Nonproductivity Program 116A. The networked computer environment 100 may also include a server 114 that is enabled to run an Indicator for Conversation Nonproductivity Program 116B that interacts with a database 112, a graphical text analyzer 118, and a communication network 110. The networked computer environment 100 may include a plurality of computers 102A, 102B and servers 114, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102A, 102B may communicate with the Indicator for Conversation Nonproductivity Program 116B running on server computer 114 via the communications network 110. The communications network 110 may include connections, such as wire, wireless communication links, or fiber optic cables. As will be discussed with reference to FIG. 6, server computer 114 may include internal components 800a and external components 900a, respectively, and client computer 102A, 102B may include internal components 800b and external components 900b, respectively. Client computer 102A, 102B may be, for example, a mobile device, a telephone, a personal digital assistant, a netbook, a laptop computer, a tablet computer, a desktop computer, or any type of computing devices capable of running a program, accessing a network, and accessing a database 112.

As previously described, the client computer 102A, 102B may access database 112 or the Indicator for Conversation Nonproductivity Program 116B, running on server computer 114 via the communications network 110. For example, a user using a client computer/mobile device 102A may engage in a conversation with a user using another client computer/mobile device 102B. As previously described, the Indicator for Conversation Nonproductivity Program 116A, 116B may measure the productivity of the conversation between the user using client computer/mobile device 102A and the user using client computer/mobile device 102B via a graphical text analyzer 118. For example, during a phone conversation, the speech to text analysis may include analysis of tone, mood, speed of speech, etc. to assess the productivity of a phone conversation. The Indicator for Conversation Nonproductivity method is explained in more detail below with respect to FIG. 5.

Figure 2:
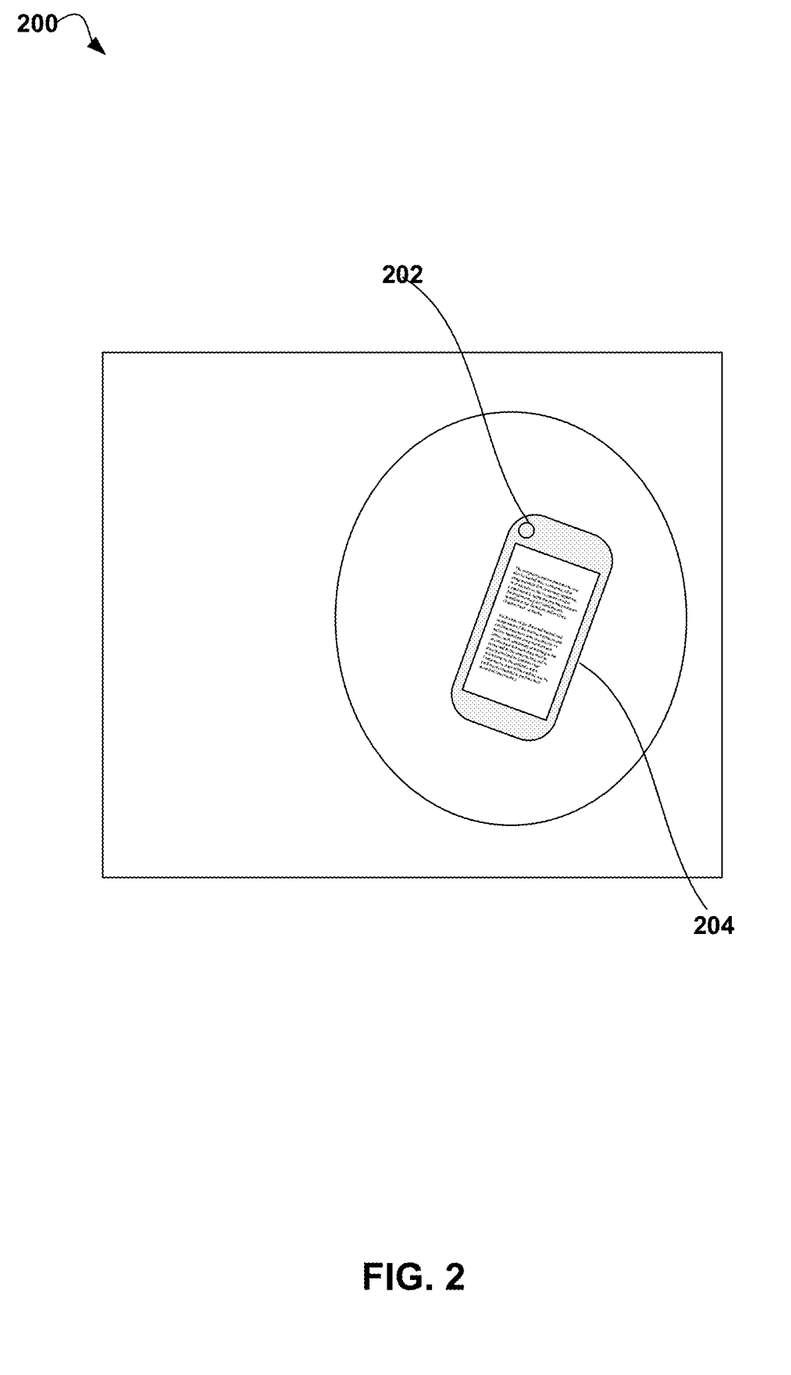
FIG. 2 is an exemplary illustration of an indicator on a smartphone according to at least one embodiment.

Referring now to FIG. 2, an exemplary illustration 200 of an indicator on a smartphone in accordance with one embodiment is depicted. According to at least one implementation, an indicator 202 at the top of the smart phone 204 may show a user that a conversation with a colleague is becoming unproductive. In certain embodiments, the indicator 202 may display a color such as orange to alert the user that the conversation is becoming unproductive. However, as previously described with respect to alternate embodiments, the alert (i.e., indicator) 202 may be a color, a flashing light, a sound (i.e., an audio alert), etc. and the color, for example, may be displayed on the phone 204, a monitor or an external device such as an activity tracker wristband. As previously described, the present embodiment may determine that a conversation has become unproductive with a confidence level C. According to the present embodiment, the conversations may be also include text chats on a smartphone 204. As such, in order to increase the confidence level C that a categorization is correct, a history of the categorization may be maintained, along with how such categorization was useful, or not useful, in the context of conversations. Thus, using active learning, related, current features, and categorizations can be compared to past categorizations and features in order to improve accuracy. Furthermore, for privacy reasons, the present embodiment may be optionally implemented in an opt-in fashion, since people may actually want improved and more efficient discussions. Also, for reasons of privacy, any content information from conversations may be discarded, anonymized from the start or later in the process.

Figure 3:
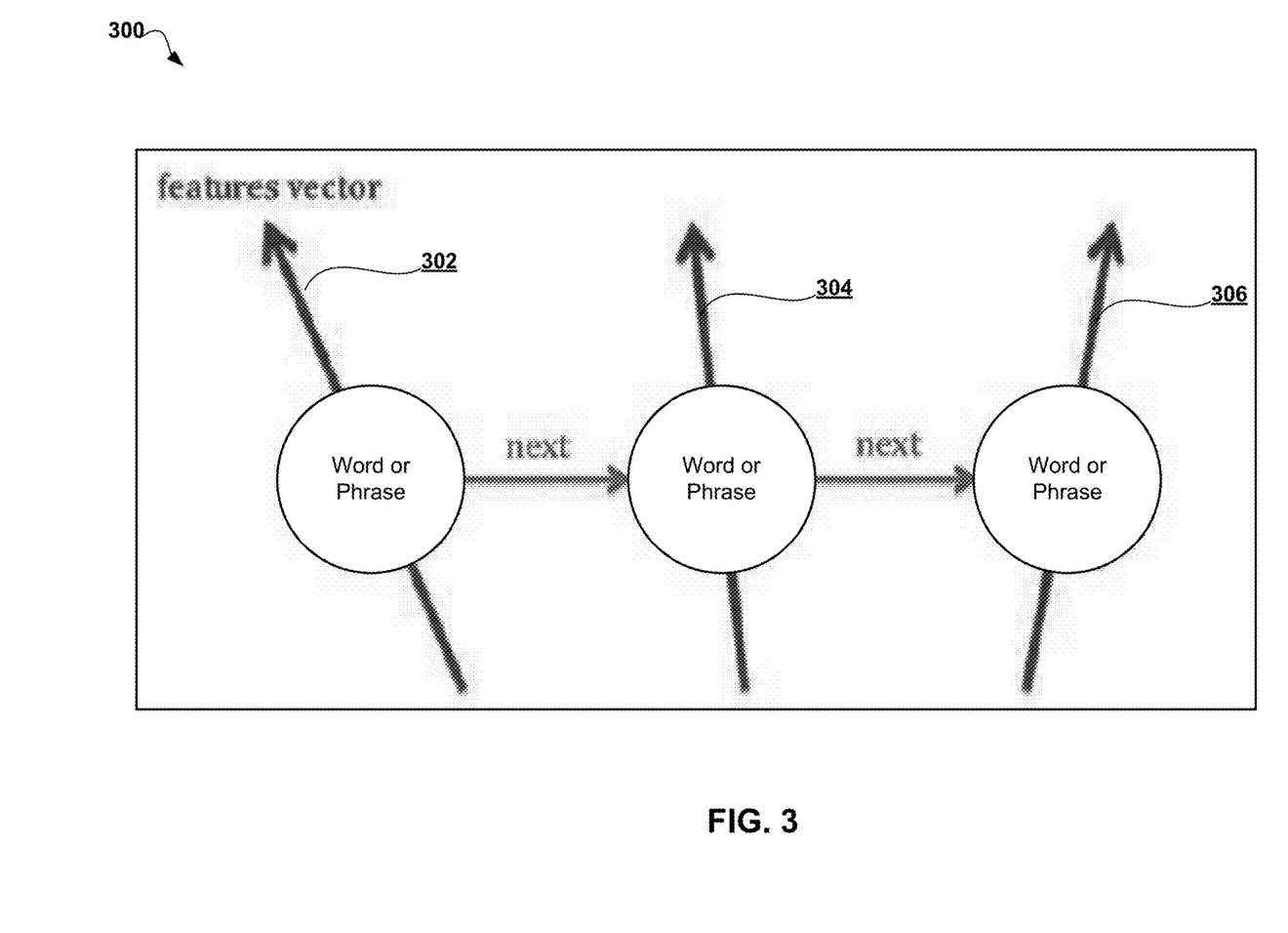
FIG. 3, is an exemplary illustration of an exemplary illustration of a Graphical Text Analyzer's output feature vector according to at least one embodiment.
Figure 4:
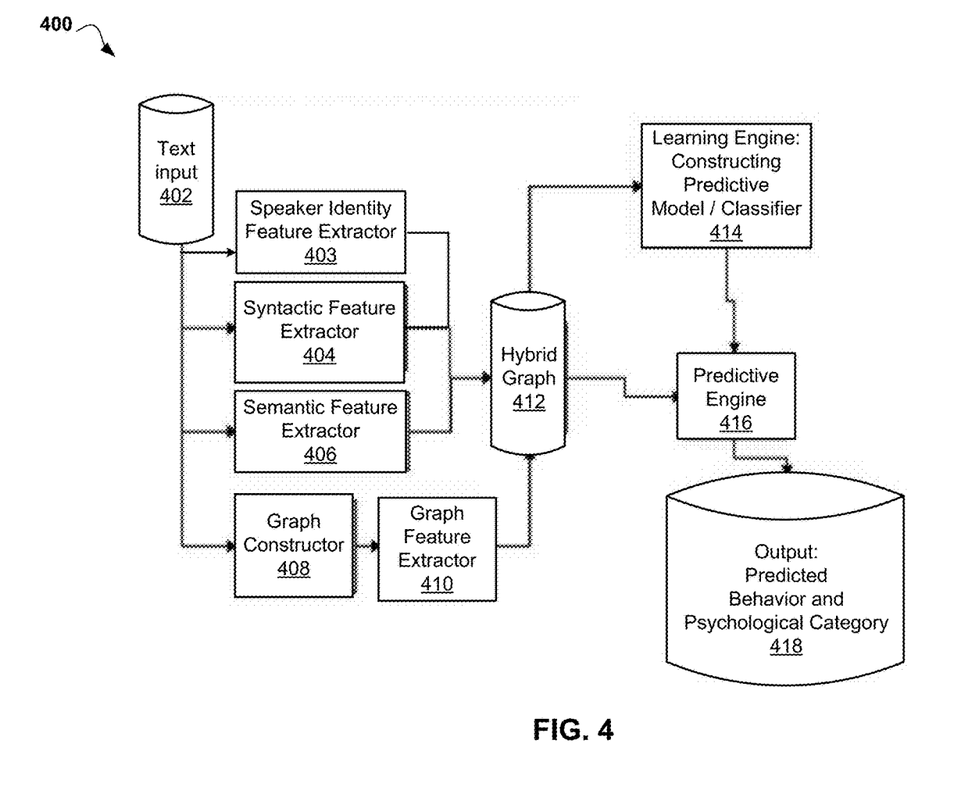
FIG. 4, is an exemplary illustration of a system architecture according to at least one embodiment.

Referring now to FIG. 3, an exemplary illustration of a Graphical Text Analyzer's output feature vector 300 in accordance with one embodiment is depicted. The features vector 302-306 may include speech and text data, such as an ordered set of words or phrases extracted from a syntactic feature extractor 404 (FIG. 4). Additionally, the features vector 302-306 may include speaker identity extracted from the features extractor 403 (FIG. 4). According to at least one implementation of the present embodiment, speech graphs are created which comprise of nodes representing words or tokens spoken by two individuals (i.e., dialogue) and edges representing the order in which words or tokens are spoken, regardless of the speaker. As such, graph topology, and hybrid graph analysis, that includes dialogue structure, and speaker identity information, can be used to indicate conversation non-productivity. The features vector implementation is described in more detail below with respect to FIG. 5.

Referring now to FIG. 4, an exemplary illustration of a system architecture 400 in accordance with one embodiment is depicted. According to at least one implementation, the present embodiment may include a Graphical Text Analyzer 118 (FIG. 1) as a combined machine learning of graph theoretic and natural language techniques to implement real-time analysis of behavior, including speech, to provide quantifiable features extracted from in-person interviews, teleconferencing or offline sources (email, phone) for categorization of psychological states.

As such, the present embodiment may include the receiving of text input 402 from users engaging in a conversation via the use of a mobile device 102A, 102B (FIG. 1). Then, the present embodiment may utilize a speaker identity feature extractor 403, a syntactic feature extractor 404, and a semantic feature extractor 406 to analyze the text input 402. Additionally, a graph constructor 408 and a graph feature extractor 410 may be used in conjunction with the results from the speaker identity feature extractor 403, the syntactic feature extractor 404, and the semantic feature extractor 406 to create a hybrid graph 412. The hybrid graph 412 is then used by a learning engine 414 for constructing a predictive model or classifier. The hybrid graph 412 is also used in conjunction with the results from the learning engine 414 and the predictive engine 416 to produce output including a predicted behavior and psychological category 418.

According to at least one implementation, the present embodiment may collect both real time and offline behavioral streams such as speech-to-text and text. However in alternate embodiments, video and physiological measures such as heart rate, blood pressure, and galvanic skin conductance can augment these measures. For example, speech and text data (i.e., text input 402) may be analyzed online for a multiplicity of features including semantic content (by a semantic feature extractor 406) and syntactic structure (by a syntactic feature extractor 404) in the transcribed text, emotional value from the audio (and in other embodiments, video and physiological streams) by a speaker identity feature extractor 403, then combined with offline analysis of similar streams produced by the patient and by the population. Although the term "speech" may be used for example purposes below, the approach described may apply to text as well.

Furthermore, the construction of graphs 408 representing structural elements of speech is based on a number of alternatives, such as syntactic value (article, noun, verb, adjective, etc.), or lexical root (run/ran/running) for the nodes of the graph, and text proximity for the edges of the graph. Graph features such as link degree, clustering, loop density, centrality, etc., represent speech structure.

Similarly, the present embodiment may use a number of alternatives to extract semantic vectors from the text, such as Latent Semantic Analysis and WordNet. These methods may allow the computation of a distance between words and specific concepts (e.g. introspection, anxiety, depression), such that the text can be transformed into a field of distances to a concept, a field of fields of distances to the entire lexicon, or a field of distances to other texts including books, essays, chapters and textbooks. The syntactic and semantic features may be combined either as 'bag of features' or as integrated fields, such as the Potts model. Similarly, the present embodiment may construct locally embedded graphs, so that a trajectory in a high-dimensional feature space is computed for each text. The trajectory is used as a measure of coherence of the speech, as well as a measure of distance between speech trajectories using methods such as Dynamic Time Warping. The extracted multi-dimensional features may then be used as predictors for psychological states (such as communication and cognitive style, or psychiatric disorders), based on training with pre-labeled interviews with test individuals. Such a method may produce models that transform text into a field of numerical values that indicate the probability that a subject belongs to a particular psychological or psychiatric category, or that he/she can enter a category in the near future. Other data modalities can be similarly analyzed and correlated with text features and categorization to extend the analysis beyond speech.

Figure 5:
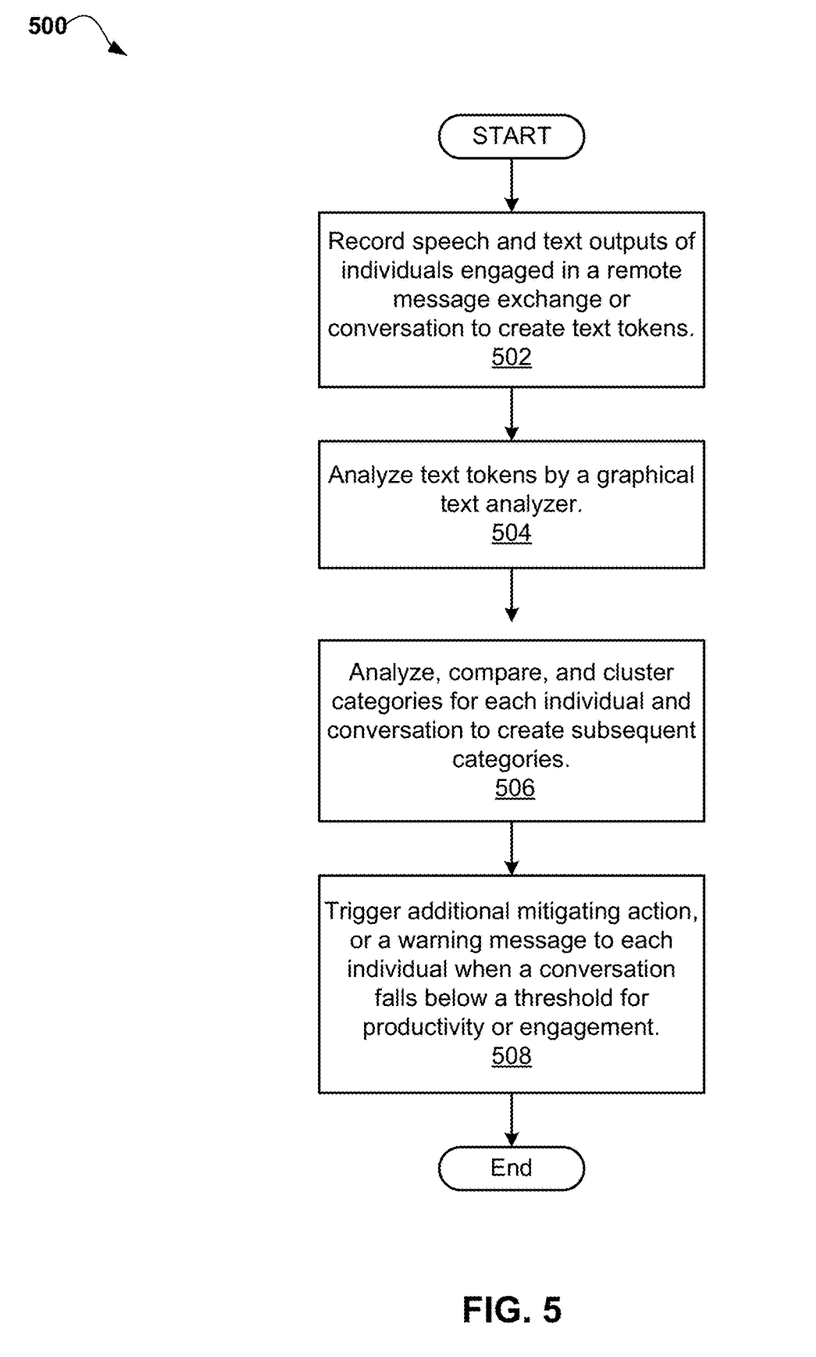
FIG. 5 is an operational flowchart illustrating the steps carried out by a program for indicating nonproductivity regarding a smartphone conversation according to at least one embodiment.

Referring now to FIG. 5, an operational flowchart 500 illustrating the steps carried out by a program indicating nonproductivity regarding a smartphone conversation according to at least one embodiment is depicted. As previously described, the present embodiment may use a graphical text analyzer 118 (FIG. 1), where speech to text is analyzed during phone conversations, such as a conversation using a smart phone or with a text, voice, or video application, such as with Skype. When the conversation is becoming unproductive with a confidence level C, an alert may be provided to the user.

At 502, the method will record the communication outputs (i.e., the speech and text outputs) of individuals engaged in a remote message exchange or conversation to create text tokens. Therefore, the Indicator for Conversation Nonproductivity Program 116A, 116B (FIG. 1) may record speech and text outputs of individuals engaged in a remote message exchange or conversation to create tokens. For example, this may be a conversation between business partners, friends, mother and son, doctor and patient using a smart phone or with a text, voice, or video application, such as with Skype®.

Then at 504, text tokens are analyzed by a graphical text analyzer 118 (FIG. 1). According to at least one implementation, the text tokens may be analyzed by a graphical text analyzer 118 (FIG. 1) using machine-learning tools that extract predictive features from token sequences. Additionally, the present embodiment may make inferences about the category of the current cognitive category of users and the cognitive state of the conversation.

A mathematical description of the graphical text analyzer 118 (FIG. 1) is as follows:

Text or speech-to-text is fed into a standard lexical parser that extracts syntactic features, which in their turn are vectorized 302-306 (FIG. 3). For instance, these vectors 302-306 (FIG. 3) can have binary components for the syntactic categories verb, noun, pronoun, etc., such that the vector:

(0,1,0,0, . . . )

represents a noun-word.

The text is also fed into a semantic analyzer that converts words into semantic vectors. The semantic vectorization can be implemented in a number of ways, for instance using Latent Semantic Analysis. In this case, the semantic content of each word is represented by a vector whose components are determined by the Singular Value Decomposition of word co-occurrence frequencies over a large database of documents; as a result, the semantic similarity between two words a and b can be estimated by the scalar product of their respective semantic vectors:

$$\text{sim}(a,b) = \vec{W}_a \cdot \vec{W}_b$$

A hybrid graph is created:

$$G = \{N, E, W\}$$

in which the nodes N represent words or phrases, the edges E represent temporal precedence in the speech, and each node possesses a feature vector W defined as a direct sum of the syntactic and semantic vectors, plus additional non-textual features (e.g., the identity of the speaker):

$$\vec{W} = \vec{W}_{syn} \oplus \vec{W}_{sem} \oplus \vec{W}_{ntxt}$$

The graph G is then analyzed based on a variety of features, including standard graph-theoretical topological measures of the graph skeleton:

$$G_{Sk} = \{N, E\}$$

such as degree distribution, density of small-size motifs, clustering, centrality, etc. Similarly, additional values can be extracted by including the feature vectors attached to each node; one such instance is the magnetization of the generalized Potts model:

$$H = \sum_n E_{nm} \vec{W}_n \cdot \vec{W}_m$$

such that temporal proximity and feature similarity are taken into account.

These features, incorporating the syntactic, semantic, and dynamical components of speech are then combined as a multi-dimensional features vector F that represents the speech sample. This feature vector is finally used to train a standard classifier:

$$M = M(\vec{F}_{train}, C_{train})$$

To discriminate speech samples that belong to different conditions C, such that for each test speech sample the classifier estimated its condition identity based on the extracted features:

$$C(\text{sample}) = M(\vec{F}_{sample})$$

Next at 506, categories for each individual and conversation are analyzed and compared, clustered, and used to create subsequent categories of productivity, usefulness, and engagement or need based on cognitive types of the users and the assessed conversation between them. To help increase the confidence of such assessments, the graphs of current conversations can be compared to those in the past that have led to one or more problems.

Then at 508, additional mitigating action, or a warning message to each individual is triggered when a conversation falls below a pre-determined threshold for productivity or engagement. As previously described, the present embodiment may determine that a conversation has become unproductive with a confidence level C. As such, in order to increase the confidence level C that a categorization is correct, a history of the categorization may be maintained, along with how such categorization was useful, or not useful, in the context of conversations. Thus, using active learning, related, current features and categorizations can be compared to past categorizations and features in order to improve accuracy. Furthermore, as previously described, the alert (i.e., indicator) 202 (FIG. 2) may be a color, a flashing light, a sound, etc. and the color, for example, may be displayed on the phone 204 (FIG. 2), a monitor, or an external device.

It may be appreciated that FIG. 5 provides only an illustration of one implementation and does not imply any limitations with regard to how different embodiments may be implemented. Many modifications to the depicted environments may be made based on design and implementation requirements. For example, as previously described with respect to an alternate implementation, the present embodiment may utilize additional inputs in addition to the text input. Additional inputs may include voice, video, and possible other measurements that can be informative about mental/emotional states and their changes, such as heart rate variability, blood pressure, galvanic skin conductance, and EEG, collected using easy-to use, inexpensive wearable devices. Similarly to the text input, voice, video and physiological measurements may be directed to the feature-extraction component of the present embodiment. As such, each type of measurement may be used to generate a distinct set of features (e.g., voice pitch, facial expression features, heart rate variability as an indicator of stress level, etc.). The joint set of features, combined with the features extracted from text, may be fed to a regression model (for predicting real-valued category, such as, for example, level of irritation/ anger, or discrete category, such as not-yet-verbalized objective and/or topic).

Figure 6:
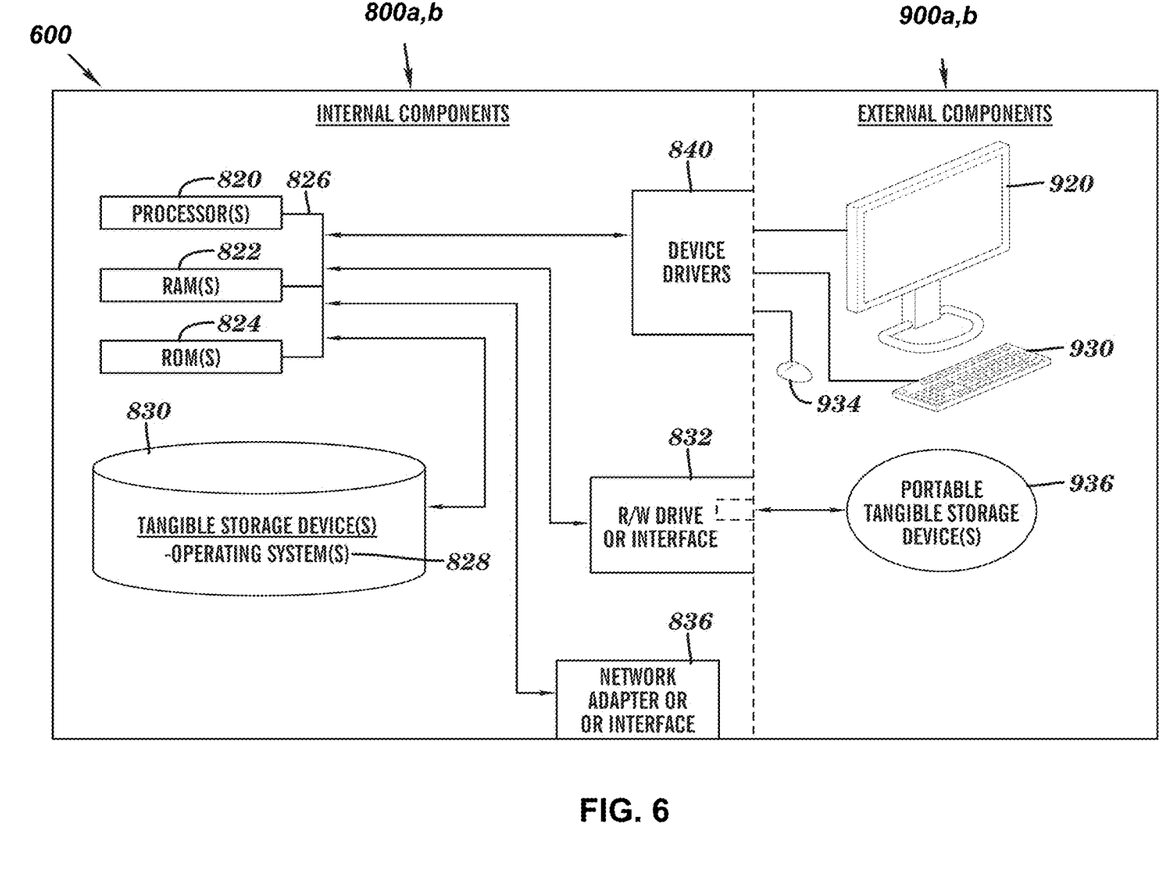
FIG. 6 is a block diagram of internal and external components of computers and servers depicted in FIG. 1 according to at least one embodiment.

Additionally, the present embodiment may include an infringement and competition probe, such that a company or service implementing the present embodiment may detect that another company is implementing this invention or service by one or more means, with a certain degree of confidence. As for example, detecting infringement of what is claimed in applying of the novel text analysis method of the present embodiment which is implemented by the Graphical Text Analyzer 118 (FIG. 1) and used in the specific context outlined. This detection may be achieved by inputting to the system a string of nonsense words, composed in sequences that indicate specific categories, independent of semantic meaning (such as degree in/out distributions, loop metrics, graph diameter, etc.) given the use of the described Graph Feature Extractor 410 (FIG. 4). Specifically, such a probe may be implemented as per the following steps:

I. Identify test category to be probed
II. Retrieve from Graphical Text Analyzer 118 (FIG. 1) a representative graphical feature of text indicating this category uniquely
III. Compose semantic free text (nonsense words) that display this graphical feature
IV. Enter gibberish into device
V. Observe if device reliably produces category FIG. 6 is a block diagram 600 of internal and external components of computers depicted in FIG. 1 in accordance with an illustrative embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102A, 102B (FIG. 1) and network server 114 (FIG. 1) may include respective sets of internal components 800 a,b and external components 900 a,b illustrated in FIG. 6. Each of the sets of internal components 800 include one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and the Software Program 108 (FIG. 1) and the Indicator for Conversation Nonproductivity Program 116A in client computer 102A, 102B (FIG. 1) and the Indicator for Conversation Nonproductivity Program 116B (FIG. 1) in network server 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 6, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a,b also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the Software Program 108 (FIG. 1) and the Indicator for Conversation Nonproductivity Program 116A, 116B (FIG. 1) can be stored on one or more of the respective portable computer-readable tangible storage devices 936, read via the respective R/W drive or interface 832 and loaded into the respective hard drive 830.

Each set of internal components 800 a,b also includes network adapters or interfaces 836 such as a TCP/IP adapter cards, wireless Wi-Fi interface cards, or 3G or 4G wireless interface cards or other wired or wireless communication links. The Software Program 108 (FIG. 1) and the Indicator for Conversation Nonproductivity Program 116A (FIG. 1) in client computer 102A, 102B (FIG. 1) and the Indicator for Conversation Nonproductivity Program 116B (FIG. 1) in network server 114 (FIG. 1) can be downloaded to client computer 102A, 102B (FIG. 1) and network server 114 (FIG. 1) from an external computer via a network (for example, the Internet, a local area network or other, wide area network) and respective network adapters or interfaces 836. From the network adapters or interfaces 836, the Software Program 108 (FIG. 1) and the Indicator for Conversation Nonproductivity Program 116A (FIG. 1) in client computer 102A, 102B (FIG. 1) and the Indicator for Conversation Nonproductivity Program 116B (FIG. 1) in network server 114 (FIG. 1) are loaded into the respective hard drive 830. The network may comprise copper wires, optical fibers, wireless transmission, routers, firewalls, switches, gateway computers and/or edge servers.

Each of the sets of external components 900 *a,b* can include a computer display monitor 920, a keyboard 930, and a computer mouse 934. External components 900 *a,b* can also include touch screens, virtual keyboards, touch pads, pointing devices, and other human interface devices. Each of the sets of internal components 800 *a,b* also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
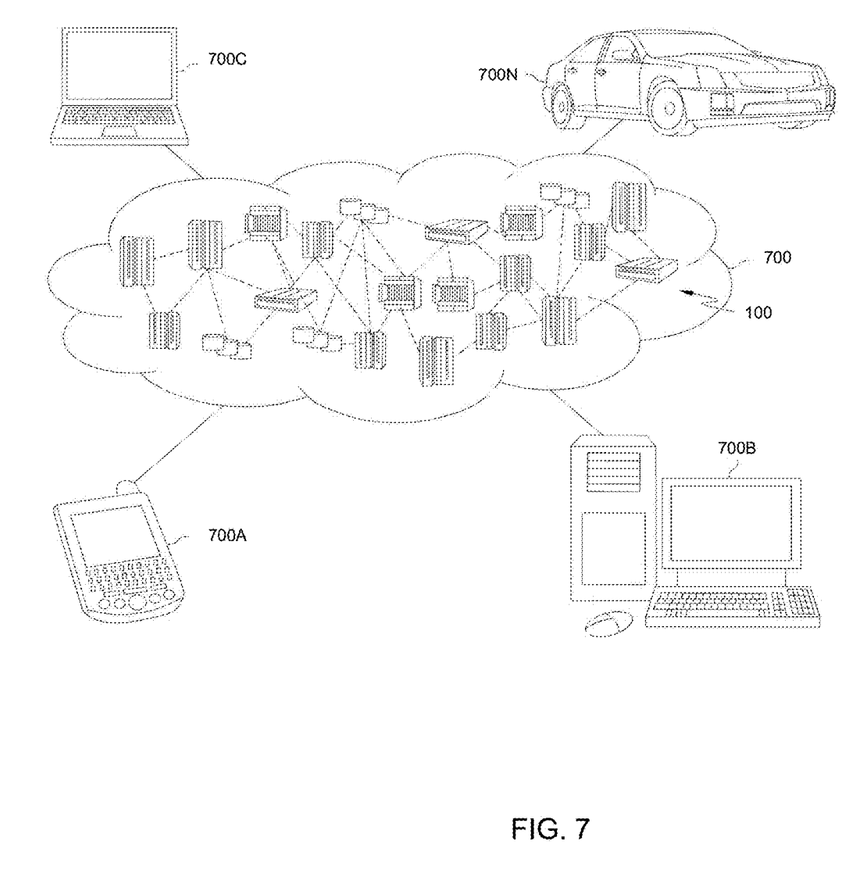
FIG. 7 is a block diagram of an illustrative cloud computing environment including the computer system depicted in FIG. 1, in accordance with an embodiment of the present disclosure.

Referring now to FIG. 7, illustrative cloud computing environment 700 is depicted. As shown, cloud computing environment 700 comprises one or more cloud computing nodes 100 with which local computing devices used by cloud consumers, such as, for example, personal digital assistant (PDA) or cellular telephone 700A, desktop computer 700B, laptop computer 700C, and/or automobile computer system 700N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 700 to offer infrastructure, platforms and/or software as services for which a cloud consumer does not need to maintain resources on a local computing device. It is understood that the types of computing devices 700A-N shown in FIG. 7 are intended to be illustrative only and that computing nodes 100 and cloud computing environment 700 can communicate with any type of computerized device over any type of network and/or network addressable connection (e.g., using a web browser).

Figure 8:
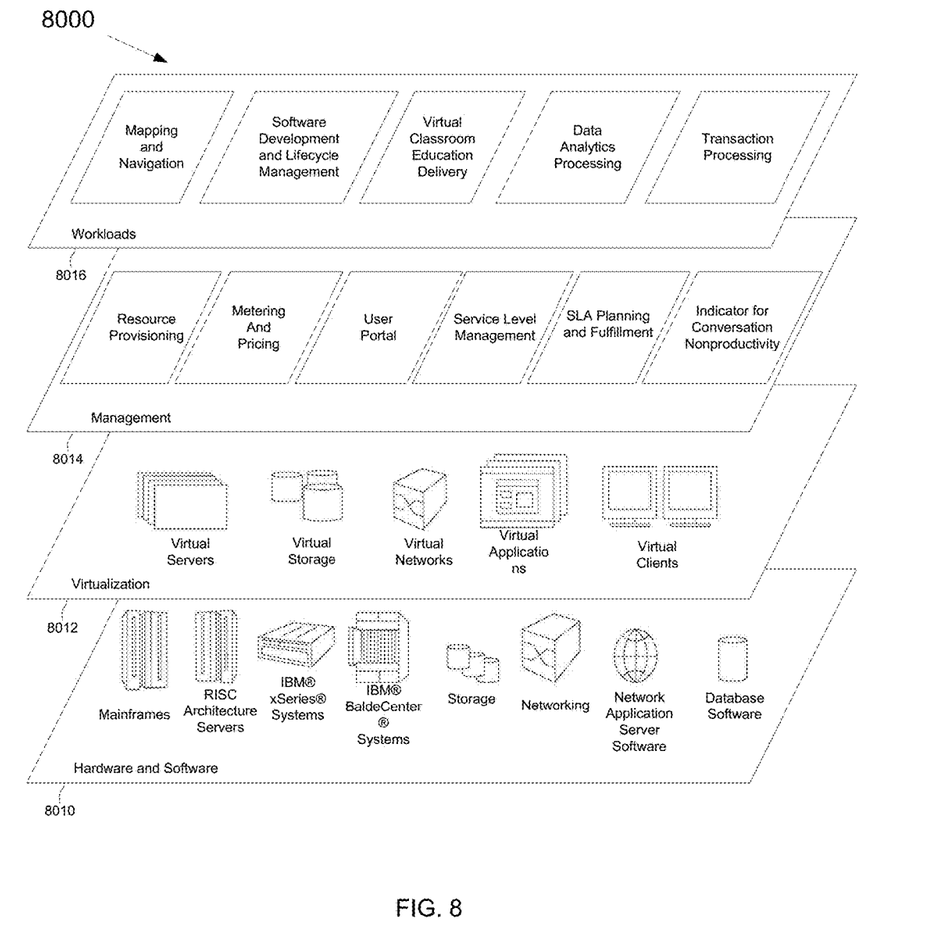
FIG. 8 is a block diagram of functional layers of the illustrative cloud computing environment of FIG. 7, in accordance with an embodiment of the present disclosure.

Referring now to FIG. 8, a set of functional abstraction layers 8000 provided by cloud computing environment 700 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 8010 includes hardware and software components. Examples of hardware components include: mainframes; RISC (Reduced Instruction Set Computer) architecture based servers; storage devices; networks and networking components. In some embodiments, software components include network application server software.

Virtualization layer 8012 provides an abstraction layer from which the following examples of virtual entities may be provided: virtual servers; virtual storage; virtual networks, including virtual private networks; virtual applications and operating systems; and virtual clients.

In one example, management layer 8014 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. An Indicator for Conversation Nonproductivity may measure the productivity of a conversation between multiple users of a mobile computing device.

Workloads layer 8016 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method to send an alert for nonproductivity associated with an online conversation, the method comprising:
   recording a plurality of communication outputs of at least two users engaged in a remote message exchange or a remote conversation, wherein the remote message exchange and the remote conversation are associated with an online communication system on a first mobile device and a second mobile device;
   creating a plurality of text tokens based on the recorded plurality of communication outputs;
   analyzing, by a graphical text analyzer, the created plurality of text tokens to determine the plurality of text tokens has fallen below a threshold, wherein determining if the plurality of text tokens has fallen below the threshold comprises comparing a plurality of graphs associated with the remote message exchange and the remote conversation to a prior plurality of graphs associated with a plurality of prior remote message exchanges and prior conversations;
   wherein the analyzing further comprises utilizing a speaker identity feature extractor, a syntactic feature extractor, and a semantic feature extractor to analyze the recorded plurality of communication outputs;
   using a graph constructor and a graph feature extractor, in conjunction with results from the speaker identity feature extractor, the syntactic feature extractor, and the semantic feature extractor to create a hybrid graph, wherein the hybrid graph comprises nodes representing words or phrases, edges representing temporal precedence in speech, and each node includes a feature vector comprising syntactic and semantic vectors, plus additional non-textual features;
   constructing, by a learning engine, a predictive model or classifier using the hybrid graph; and
   sending an alert to the plurality of users involved in the conversation when it is determined that the plurality of text tokens has fallen below the threshold, wherein the sent alert comprises of a color, a flashing light, and a sound that is associated with the first mobile device or the second mobile device.

2. The method of claim 1, wherein the plurality of text tokens are created to categorize the remote message exchange or the remote conversation and a cognitive state associated with at least one of the at least two users.

3. The method of claim 1, wherein the analyzing comprises comparing and clustering at least one category associated with at least one of the at least two users to create a plurality of subsequent categories.

4. The method of claim 1, wherein the analyzing comprises of a plurality of features vector that includes an identity of at least one of the at least two users and words or tokens spoken by at least one of the at least two users.

5. The method of claim 1, wherein the analyzing of the created plurality of text tokens comprises the use of a plurality of machine learning tools.

6. The method of claim 5, wherein the plurality machine learning tools are used to extract a plurality of predictive features from a plurality of token sequences to make inferences about a category of a current cognitive category of at least one of the two users and a cognitive state of the remote message exchange or the remote conversation.

7. A computer system to send an alert for nonproductivity associated with an online conversation, the computer system comprising:
   one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:

recording a plurality of communication outputs of at least two users engaged in a remote message exchange or a remote conversation, wherein the remote message exchange and the remote conversation are associated with an online communication system on a first mobile device and a second mobile device;

creating a plurality of text tokens based on the recorded plurality of communication outputs;

analyzing, by a graphical text analyzer, the created plurality of text tokens to determine the plurality of text tokens has fallen below a threshold, wherein determining if the plurality of text tokens has fallen below the threshold comprises comparing a plurality of graphs associated with the remote message exchange and the remote conversation to a prior plurality of graphs associated with a plurality of prior remote message exchanges and prior conversations;

wherein the analyzing further comprises utilizing a speaker identity feature extractor, a syntactic feature extractor, and a semantic feature extractor to analyze the recorded plurality of communication outputs;

using a graph constructor and a graph feature extractor, in conjunction with results from the speaker identity feature extractor, the syntactic feature extractor, and the semantic feature extractor to create a hybrid graph, wherein the hybrid graph comprises nodes representing words or phrases, edges representing temporal precedence in speech, and each node includes a feature vector comprising syntactic and semantic vectors, plus additional non-textual features;

constructing, by a learning engine, a predictive model or classifier using the hybrid graph; and sending an alert to the plurality of users involved in the conversation when it is determined that the plurality of text tokens has fallen below the threshold, wherein the sent alert comprises of a color, a flashing light, and a sound that is associated with the first mobile device or the second mobile device.

8. The computer system of claim 7, wherein the plurality of text tokens are created to categorize the remote message exchange or the remote conversation and a cognitive state associated with at least one of the at least two users.

9. The computer system of claim 7, wherein the analyzing comprises comparing and clustering at least one category associated with at least one of the at least two users to create a plurality of subsequent categories.

10. The computer system of claim 7, wherein the analyzing comprises of a plurality of features vector that includes an identity of at least one of the at least two users and words or tokens spoken by at least one of the at least two users.

11. The computer system of claim 7, wherein the analyzing of the created plurality of text tokens comprises the use of a plurality of machine-learning tools.

12. The computer system of claim 11, wherein the plurality machine learning tools are used to extract a plurality of predictive features from a plurality of token sequences to make inferences about a category of a current cognitive category of at least one of the two users and a cognitive state of the remote message exchange or the remote conversation.

13. A computer program product to send an alert for nonproductivity associated with an online conversation, the computer program product comprising:

one or more computer-readable storage devices and program instructions stored on at least one of the one or more tangible storage devices, the program instructions executable by a processor, the program instructions comprising:

program instructions to record a plurality of communication outputs of at least two users engaged in a remote message exchange or a remote conversation, wherein the remote message exchange and the remote conversation are associated with an online communication system on a first mobile device and a second mobile device;

program instructions to create a plurality of text tokens based on the recorded plurality of communication outputs;

program instructions to analyze, by a graphical text analyzer, the created plurality of text tokens to determine the plurality of text tokens has fallen below a threshold, wherein determining if the plurality of text tokens has fallen below the threshold comprises comparing a plurality of graphs associated with the remote message exchange and the remote conversation to a prior plurality of graphs associated with a plurality of prior remote message exchanges and prior conversations;

wherein the analyzing further comprises program instructions to utilize a speaker identity feature extractor, a syntactic feature extractor, and a semantic feature extractor to analyze the recorded plurality of communication outputs;

program instructions to use a graph constructor and a graph feature extractor, in conjunction with results from the speaker identity feature extractor, the syntactic feature extractor, and the semantic feature extractor to create a hybrid graph, wherein the hybrid graph comprises nodes representing words or phrases, edges representing temporal precedence in speech, and each node includes a feature vector comprising syntactic and semantic vectors, plus additional non-textual features;

program instructions to construct, by a learning engine, a predictive model or classifier using the hybrid graph; and program instructions to send an alert to the plurality of users involved in the conversation when it is determined that the plurality of text tokens has fallen below the threshold, wherein the sent alert comprises of a color, a flashing light, and a sound that is associated with the first mobile device or the second mobile device.

14. The computer program product of claim 13, wherein the plurality of text tokens are created to categorize the remote message exchange or the remote conversation and a cognitive state associated with at least one of the at least two users.

15. The computer program product of claim 13, wherein the analyzing comprises comparing and clustering at least one category associated with at least one of the at least two users to create a plurality of subsequent categories.

* * * * *